United States Patent

[11] 3,619,379

[72] Inventor Rene Bidard
 Paris, France
[21] Appl. No. 802,106
[22] Filed Feb. 25, 1969
[45] Patented Nov. 9, 1971
[73] Assignee Compagnie Electro-Mecanique
 Paris, France
[32] Priority Mar. 4, 1968
[33] France
[31] 142,244

[54] CENTRIFUGAL, MULTIEFFECT DISTILLATION APPARATUS
 6 Claims, 9 Drawing Figs.
[52] U.S. Cl. .................................................. 202/174,
 202/235, 203/11, 203/88
[51] Int. Cl. ...................................................... B01d 3/06
[50] Field of Search .......................................... 202/197,
 173, 174, 235; 203/88, 10, 11, 91; 55/461; 159/17, 2

[56] References Cited
 UNITED STATES PATENTS
3,003,931 10/1961 Worthen et al. ............... 202/197 X
3,174,914 3/1965 Worthen et al. ............... 203/88 X
3,204,394 9/1965 Kaufmann et al. ............. 55/461 X
3,233,879 2/1966 Mitchell ....................... 159/6 UX
3,418,214 12/1968 Cane ............................ 202/173 X
3,427,227 2/1969 Chamberlin ................... 203/88 X
3,442,765 5/1969 Levite ........................... 202/173
3,251,397 5/1966 Lens ............................. 159/17
3,509,932 5/1970 Chambers ..................... 159/2

Primary Examiner—Norman Yudkoff
Assistant Examiner—David Edwards
Attorney—Pierce, Scheffler, and Parker ABSTRACT: Device for distillation of a liquid, particularly sea water, comprises a plurality of stages each of which includes at least one cell through which the liquid flows and in which steam produced by evaporation is separated from the unevaporated liquid in order to obtain a condensate. The device employs one or more expansion nozzles in each cell through which the liquid expands and is thus converted partly into its vapor phase as a result of the reduction in pressure. The composite liquid and gaseous fluid passes along a curved flow surface which, as a result of the centrifugal forces created effects separation of the liquid from the steam. The steam is then condensed and the remaining liquid passes through a heat exchanger and is then recycled.

Inventor
René Bidard
By Pierce, Scheffler & Parker
Attorneys

CENTRIFUGAL, MULTIEFFECT DISTILLATION APPARATUS

The invention concerns a device for the distillation of a liquid, especially sea water, in several stages which each have at least one cell through which the liquid flows and in which steam produced by evaporation is separated from the unevaporated liquid in order to obtain a condensate.

Conventional devices of this kind require a considerable amount of mechanical or electrical power and a correspondingly large plant in order to ensure that the liquid circulates in the tubes of the heat exchangers and/or from one distillation stage to the next.

The object of the invention is to avoid these disadvantages by achieving the circulation through all the elements by thermodynamic means. This problem is solved by means of a combination of the following elements which are known per se and of which there is at least one in each cell, the liquid to be distilled flowing through these elements in series:

an expansion nozzle in which steam occurs due to a reduction in pressure so that the flow velocity of the liquid increases;

a curved surface along which the liquid flows and whereby due to the influence of the centrifugal forces an inwardly directed free surface forms where the steam separates from the liquid;

a diffuser which mainly only takes part of the unevaporated liquid and converts part of its velocity into pressure which at the outlet of the diffuser is higher than at the inlet of the expansion nozzle;

a heat exchanger through which at least a part of the unevaporated liquid flows, whereby it is heated.

The expansion nozzle, of which there may be several in each cell and which are then arranged in parallel, is so constructed that the liquid can expand when it flows through it, whereby during this expansion or pressure reduction it partly evaporates. An emulsion forms which when it is discharged from the nozzle has a velocity considerably lower than that which the liquid alone would have for the same expansion without any evaporation.

The liquid flows with a high velocity along the curved flow surface which for instance can be cylindrical. Due to the influence of the centrifugal forces a separation occurs between the remaining liquid and the steam, whereby the liquid moves outwards and a free surface is formed towards the inside of the curve where the steam is discharged along the flow path. The steam is passed to a condenser through which a cooler medium flows. This medium can either be unevaporated liquid from a colder cell or a medium which comes from an external cold source. The condensate which collects in the condenser is extracted and is one of the two products of this cell. The other one, the unevaporated liquid which has become somewhat concentrated due to evaporation, passes on to the succeeding constructional element, as described below.

In the diffuser, several of which can be arranged in each cell, the high velocity of the unevaporated liquid is retarded, whereby a part of its flow energy is converted into pressure. In accordance with the invention the diffuser is so constructed that the pressure of the liquid at its outlet is appreciably higher than at the inlet of the expansion nozzle.

At least part of the liquid which is discharged from the diffuser flows to the heat exchanger where it is heated. The liquid can thus either flow back to the inlet of the expansion nozzle, so that it is again expanded in the same cell and partly evaporated and then subjected to the subsequent process steps, or it can be passed to a warmer cell. When the liquid flows through the heat exchanger its pressure drops, but nevertheless the pressure is still high afterwards and as already mentioned is slightly above that at the inlet of the expansion nozzle.

Generally only part of the unevaporated liquid is recirculated through the same cell, because otherwise the concentration in this cell would rise to an indefinite degree, and a certain supplementary amount of liquid is always necessary in order to replace at least the evaporated liquid. The remaining part of the unevaporated liquid serves as a supplementary amount in one of the subsequent cells, which can be either a warmer or colder cell.

In the former case it is an advantage if the tapped-off liquid is heated before it is introduced into the next cell, this being achieved in a further heat exchanger. Normally the pressure inside the warmer cell is higher than that in the cell from which the liquid has been tapped. It is, however, possible to introduce this supplementary amount of liquid into the warmer cell due to the fact that the pressure of the unevaporated liquid rises considerably when it passes through the diffuser so that it not only covers the pressure losses in the heat exchanger but can also overcome the pressure difference between the internal chambers of the two connected cells. In this case the introduction of the supplementary amount of liquid is generally not accompanied by an expansion and a considerable evaporation. It is also possible without departing from the spirit of the invention, to pass the entire amount of unevaporated liquid through this second heat exchanger and then to a warmer cell, although it is thermodynamically more favorable when only part of the liquid is tapped off and the remaining part is allowed to recirculate in the cell.

It is to be noted that both the aforementioned heat exchangers in which a liquid is heated, are supplied with the necessary amount of heat either by the condensation of steam from another warmer cell or by means of heat from an external source.

If the tapped-off liquid is supplied to a colder cell as supplementary liquid, then also the pressure in this cell is lower. Without prior heating it is thus possible for expansion and partial evaporation to occur, whereby this can already take place in the supply pipe when it is suitably designed for this purpose.

The double possibility of introducing the tapped-off liquid into the next cell, either by raising or lowering the temperature and without having to provide a number of mechanical pumps, gives the designer considerable latitude. The steps of the process which has been described can be performed with various types of cells, some examples of which are illustrated in the accompanying drawings and also described.

FIGS. 3b to 3e show details of FIG. 3a;

In all the Figures those parts which serve the same purpose are provided with the same reference numbers.

Figure 1:
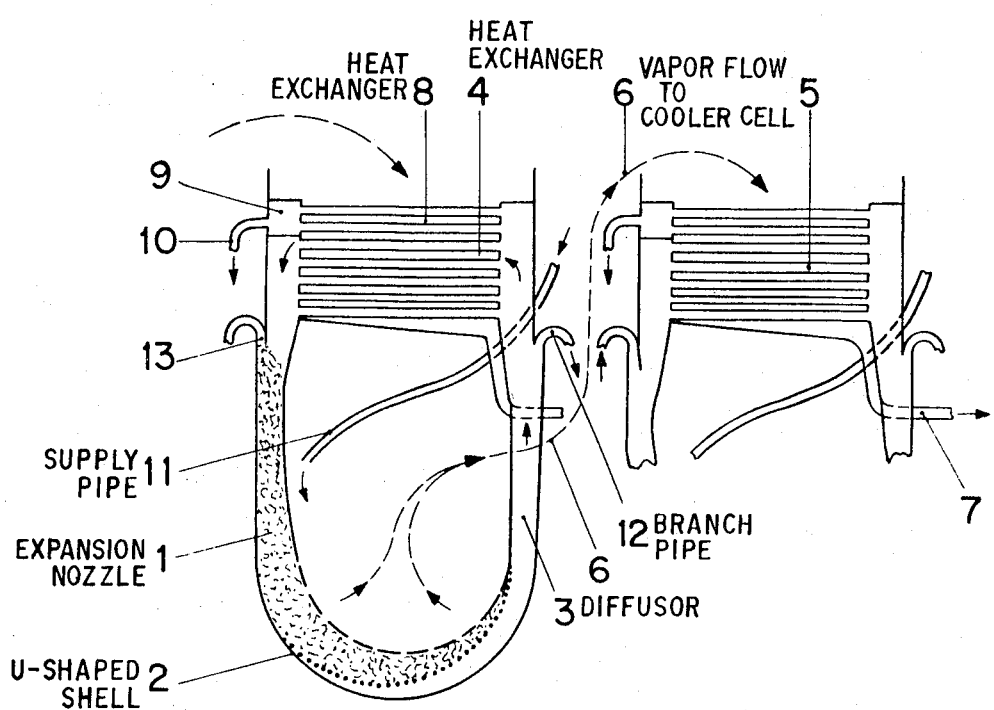
FIG. 1 shows a semicylindrical form in a vertical section along the generatrix.

In FIG. 1 both the aforementioned possibilities—the liquid tapped off in a cell and passed into a warmer or colder cell to act as supplementary liquid—whereby actually one possibility excludes the other, are both shown in FIG. 1 for the sake of simplicity. Reference number 1 indicates the expansion nozzle, 2 is the curved surface, 3 is the diffuser, and 4 the heat exchanger in which the liquid that flows back into the cell and is thus circulated afresh is heated. Five is the condenser in which the steam generated in the cell in question is condensed; in this case it is the same heat exchanger 4 of a colder cell. The flow path there is indicated by the arrow 6; in reality suitably arranged pipes form the flow path. The condensed liquid discharges through the pipe 7.

The free surface where the steam, which occurs due to the pressure reductions in the expansion nozzle, separates out is indicated by the broken line and corresponds to the curved surface 2. The separating surface between the emulsion region and the separated liquid is indicated by the dotted line.

When part of the unevaporated liquid is tapped off and supplied to a warmer cell as supplementary liquid, a heat exchanger 8 is provided for heating this liquid. The liquid which flows through the heat exchanger is conveyed from the collector 9 through a pipe 10 to the next cell. As already explained, the evaporated and tapped-off quantity has to be augmented again by way of the supply pipe 11.

Conditions are different when the tapped-off partial quantity has to be supplied to a colder cell as supplementary liquid. Since no heating is necessary, elements 8, 9, 10 and 11 are not required and the partial quantity is tapped off after the diffuser 3 through the branch pipe 12 and supplied to the next cell. The necessary supplementary liquid is supplied through the connection pipe 13 where, when it has a suitable form, a first expansion and evaporation already occurs before the supplementary liquid reaches the expansion nozzle 1.

From the description of FIG. 1, it is obvious that for the first operating case (tapped-off liquid introduced into a warmer cell) elements 12 and 13 are not present.

For the two constructional examples which are combined in FIG. 1, the cells can be arranged either side by side or one above the other. The length of the cells perpendicular to the plane of the drawing is optional. Moreover, since the supplementary quantity which is passed from one cell to the next constantly diminishes due to evaporation, it is possible to arrange two or more cells per stage in parallel at the beginning of each series of cells or the size of the cells can decrease in size as the quantity of supplementary liquid diminishes.

Figure 2:
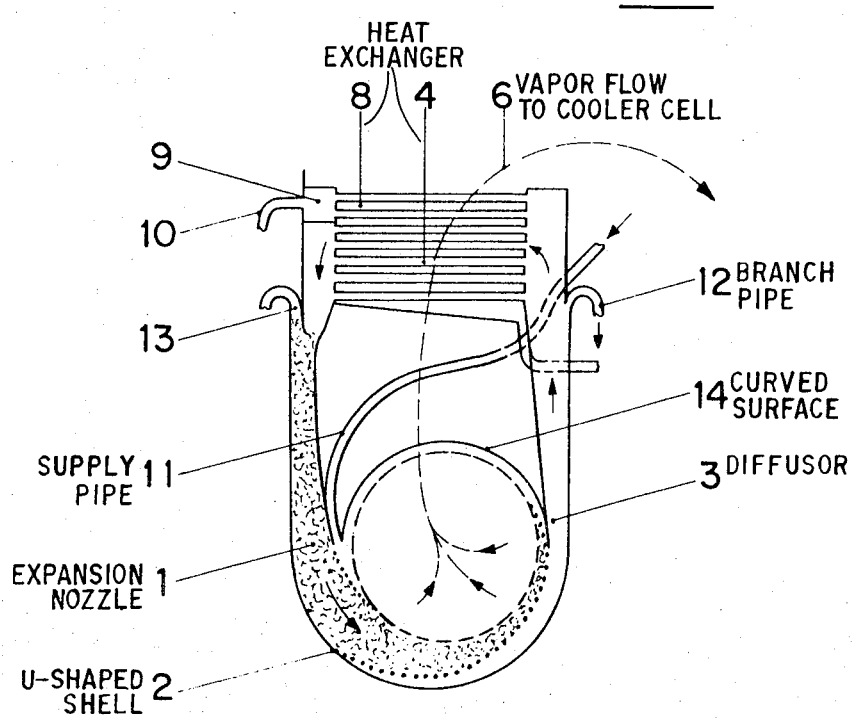
FIG. 2 is a modified form of that shown in FIG. 1.

FIG. 2 shows a cell similar to that of FIG. 1, but the system for separating the steam from the unevaporated liquid is shown in more detail. The first separation occurs before the pressure is increased by the diffuser 3, namely along the curved flow surface 2 which is semicircular. The separation of the remaining steam bubbles as well as a slight further evaporation of the liquid occurs in a whirl chamber that is nearly closed along its periphery and which has a curved surface 14 which augments the curved flow surface 2.

When the cell is very long in the direction perpendicular to the plane of the drawing, it is necessary to subdivide the whirl chamber by means of walls parallel to the plane of the drawing, so that the passage of the steam between these walls in the direction of the arrow 6 is facilitated.

Figure 3A:
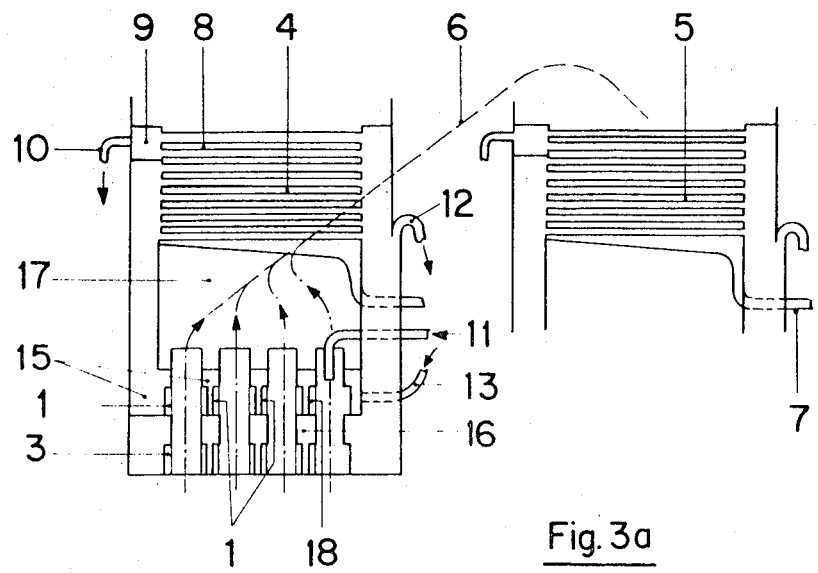
FIG. 3a shows another constructional form.

According to FIG. 3a the separation of the steam from the unevaporated liquid is achieved by means of a number of small whirl chambers 33 located in each cell, the entire amount of liquid of the cell flowing through these chambers in parallel.

Figure 3B:
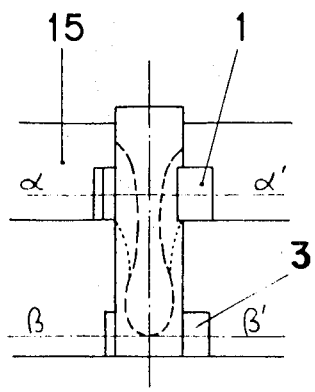
Figure 3E:
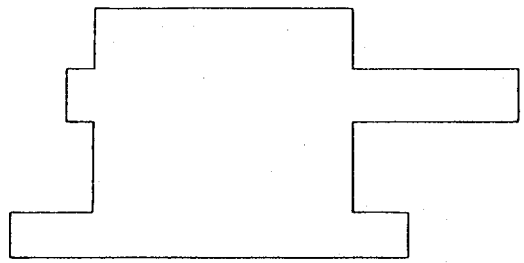
Figure 3C:
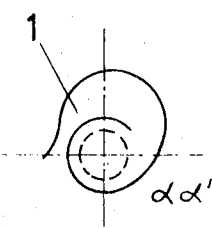
Figure 3D:
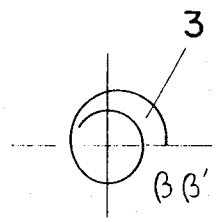

FIG. 3b shows to a larger scale a whirl chamber in vertical section. FIG. 3c is a sectional view taken along the line $\alpha-\alpha$ in FIG. 3b at the level of the expansion nozzle 1, whilst FIG. 3d is a sectional view taken along the line $\beta-\beta$ in FIG. 3b at the level of the diffuser 3. Such a whirl chamber can be made from a single metal sheet of the shape shown in FIG. 3e and which is bent to the required form. The free surface indicated by the broken lines in FIG. 3b occurs automatically in each whirl chamber due to the rotation of the liquid.

FIG. 3a shows an arrangement where a number of such whirl chambers 33 are located in one cell. A common pipe 15 supplies all the expansion nozzles of the whirl chambers and the unevaporated liquid discharged from the diffusers 3 of the whirl chambers passes to a common collecting chamber 16. The separated steam collects in an upper chamber 17 before it passes to the condenser 5.

Also in connection with this constructional example the reintroduction of the liquid discharged from the heat exchanger 4 as well as the possibility of passing on a certain amount of liquid and introducing a corresponding supplementary amount of liquid as shown. This constructional example, however, also provides a special construction for the case where the liquid which is tapped off at 10 passes to a warmer cell, namely a pipe 11 for supplying the supplementary quantity which extends into the whirl chamber. When the partial amount of liquid which flows out through the branch pipe 12 passes to a colder cell, then the inflow pipe 13 for a corresponding supplementary amount supplies the expansion nozzle 1 of one or more whirl chambers which are separated by a wall 18 from the whirl chambers that are supplied by way of pipe 15.

Figure 4:
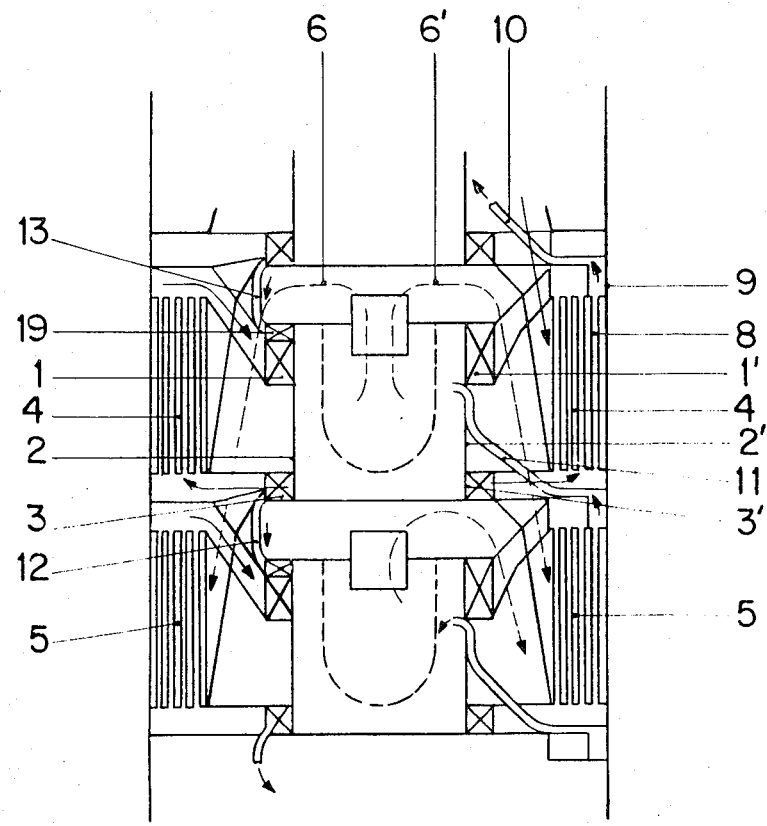
FIGS. 4 and 5 illustrate other constructional forms.

FIG. 4 illustrates a constructional example of the invention where each cell is provided with a large whirl chamber and the cells are arranged one above the other. This arrangement also comprises the following basic elements which have already been referred to.

A. The expansion nozzle, where during expansion a partial evaporation occurs. In the present example there are a number of expansion nozzles corresponding to the number of supply pipes, these being formed by annular blade grids, 1, 1' with intermediate channels between the blades which act as expansion nozzles. The ring 1, 1' completely surrounds the whirl chamber and can supply it along its entire periphery.

B. The curved flow surface, formed by a cylinder 2,2' which forms the casing of the whirl chamber. The free surface indicated by the broken lines is also cylindrical. As in the case of the construction according to FIG. 2, a further evaporation also occurs here in the whirl chamber.

C. The diffuser where at its outlet the pressure of the unevaporated liquid is higher than that at the inlet of the expansion nozzle. In this constructional example there are several diffusers as is also the case with the expansion nozzles. These diffusers are in the form of annular blade grids, 3,3' which are so shaped that in the intermediate channels the tangential components of the velocity are at least partly converted into pressure.

D. The heat exchanger in which the liquid that has to be evaporated is heated.

Each half of FIG. 4 shows a different constructional form of the invention. The right-hand side shows how a cell has to be constructed when the tapped-off liquid flows to a warmer cell and serves as a supplementary quantity. In this case a heat exchanger 8 is provided which serves to heat the tapped-off liquid and also a collecting chamber 9 from which the liquid is discharged through pipe 10 to the warmer cell. The necessary supplementary liquid is supplied to the cell through pipe 11.

The left-hand side of FIG. 4 illustrates the case where the tapped-off liquid flows to a colder cell and serves as a supplementary quantity, branch pipe 12 and connecting pipe 13 being provided for this purpose. Pipe 13 supplies a special part 19 of the annular grid 1, whereby the blades of this grid can be adapted to the outlets of part 19.

It is to be noted that in FIG. 4 the upper cell is warmer and the lower one colder. A reverse arrangement is also possible and furthermore the cells can also be arranged next to each other.

The possibility of being able to allow the supplementary quantities of the cells to flow onward in a simple manner, either when the temperature rises or falls, enables a distillation unit to be provided having two series of cells which mutually complete each other. In one series, the supplementary quantities flow from cell to cell with increasing temperatures and in the other series with decreasing temperatures. The condensers of both series can be connected together in such a manner that the heat calories for the supplementary quantity in the series having a rising temperature are supplied by the heat of condensation from steam taken from the second series having a supplementary quantity with a falling temperature. This is possible when the thermal equilibrium is maintained.

Figure 5:
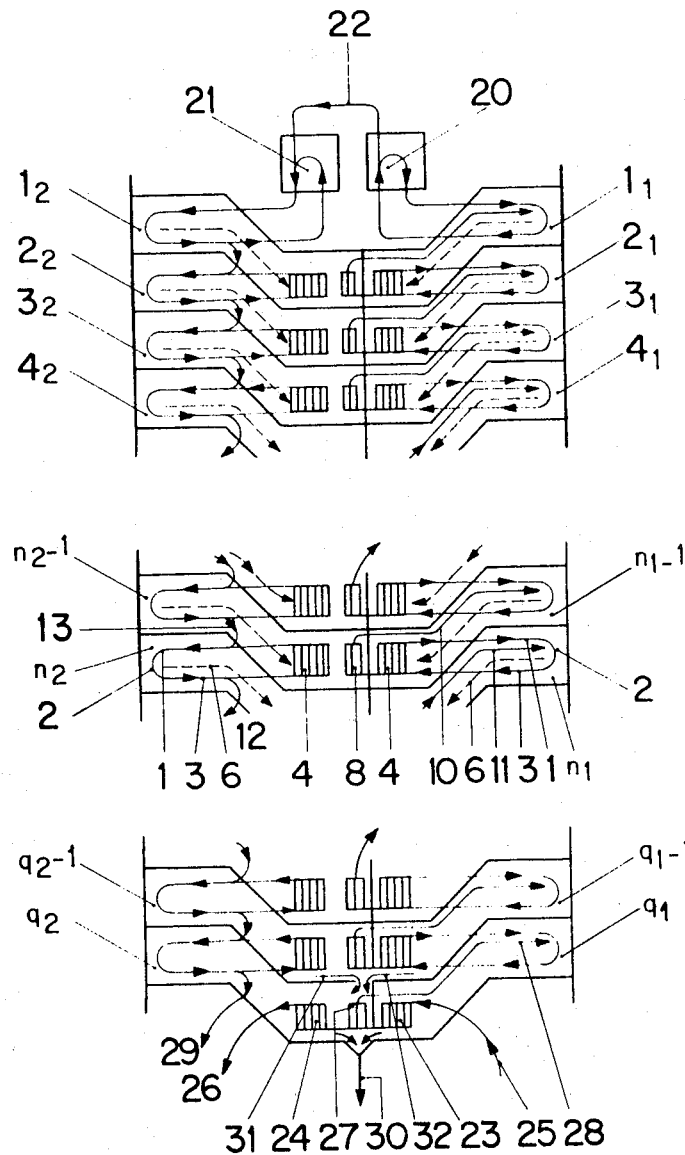

FIG. 5 shows the arrangement for such a double series of cells, the first series with rising temperatures for the supplementary amounts being on the right side and the second series with falling temperatures being on the left side. The cells of the first series are indicated by $1_1, 2_1...n_1...q_1$, the cells of the second series by $1_2, 2_2...n_2...q_2$. The supplementary quantities flow upwards in the first series and downwards in the second series.

For this method of operation it is necessary that the heat exchanger 8, which is provided for heating the supplementary quantity in the first series of cells, is surrounded by a condensation part of the second series and not be a condensation part of the first series. In the heat exchanger 8, a condensation of the steam also occurs which results from the reevaporation of the distilled liquid that is obtained from the cells which are located above the heat exchanger.

At the top of both series where the temperatures are highest, two heat exchangers 20 and 21 are provided which receive heat from a suitable source, for instance steam from a boiler. These heat exchangers heat on the one hand the liquid which recirculates in cells $1_1$ and $1_2$ and on the other hand the supplementary quantity which flows from cell $1_1$ to $1_2$.

Condensers 23 and 24 at the end of the unit where the temperatures are lowest serve both series as coolers, through which a cooling medium flows which enters at 25 and leaves at 26. A condenser 27 can also be provided for warming the supplementary quantity which passes at 28 into the lowest cell of the first series. The highly concentrated liquid which remains after the distillation, is discharged at 29 from the last cell of the second series.

Reference number 30 indicates the outlet for the liquid obtained from distillation. The liquid comes from the condensers of both series but its flow path through the whole unit is not shown. It is sufficient to note that it is collected in each stage in the corresponding cell of the second series whence it flows downwards from stage to stage in cascades. Due to successive expansion, part of the liquid evaporates, condenses again at the heat exchanger 8, and thus heats up the supplementary quantity of the first series. The details of this process are only indicated in cells $q_1$ and $q_2$ by the arrows 31 and 32.

With such an arrangement the power necessary for circulating the liquid that has to be distilled is obtained in the whole system purely by thermodynamic means. The concentration of the liquid finally obtained can be regulated as desired by varying the proportion of the inner recirculation in all the cells. Moreover, the concentration of the liquid to be distilled which flows through pipe 22 from the first to the second series can be regulated by varying the amount of internal recirculation in one series with respect to that in order series, whereby any desired value between that at the inlet and that at the outlet can be obtained.

The device according to the invention has the following advantages due to the fact that only thermodynamic means are used for the transportation of all the media: — less mechanical energy is required; less space is required because various auxiliary machinery is no longer necessary; the free circulation of the media results in a more efficient and simpler assembly of the distillation stages.

I claim:

1. Apparatus for distillation of an impure liquid comprising a plurality of interconnected distillation cells operating at different temperatures, each cell comprising a heat exchanger, an outer U-shaped shell, a first continuous inner wall spaced from the outer leg of the U-shaped shell to provide an expansion nozzle for the introduction of at least a portion of heated impure liquid from the heat exchanger, whereby the expansion of the liquid causes partial evaporation in the expansion nozzle, the evaporated liquid then moving toward the center of the shell due to the centrifugal forces acting on the liquid as the mixture of the liquid and the vapors pass around the circumference of the U-shaped shell, means for removing the evaporated liquid from said cell to be condensed in a condenser or the heat exchanger of another cell, a second inner wall spaced from the opposite vertical leg of the U-shaped shell to form a diffuser for receiving unevaporated liquid, the cross section of the diffuser having the same dimension as the cross section of the unevaporated liquid admitted into the diffuser, said diffuser causing the pressure of the unevaporated liquid to increase and means for passing at least a portion of the unevaporated liquid to said heat exchanger, the said first and second inner walls being interrupted and discontinuous at the bight of the U-shaped shell to permit the evaporated liquid to be removed from the shell and passed in heat exchange with a distillation cell operating at lower temperature.

2. Apparatus as claimed in claim 1 and further comprising means for passing a portion of the heated impure liquid from the heat exchanger to the inlet of a warmer cell.

3. Apparatus as claimed in claim 1 and further comprising means for passing a portion of the unevaporated liquid from the diffuser to a colder cell.

4. Apparatus as claimed in claim 1 and further comprising means for supplying evaporated liquid from a warmer cell to the heat exchanger for supplying heat thereto and for condensing said evaporated liquid.

5. Apparatus as claimed in claim 1 wherein the U-shaped shell has the form of a half cylinder.

6. Apparatus as claimed in claim 1 and further comprising a half cylindrical wall disposed facing and above the bottom of the U-shaped shell whereby the liquid will follow a curved path and form a vortex therebetween.

* * * * *